UNITED STATES PATENT OFFICE.

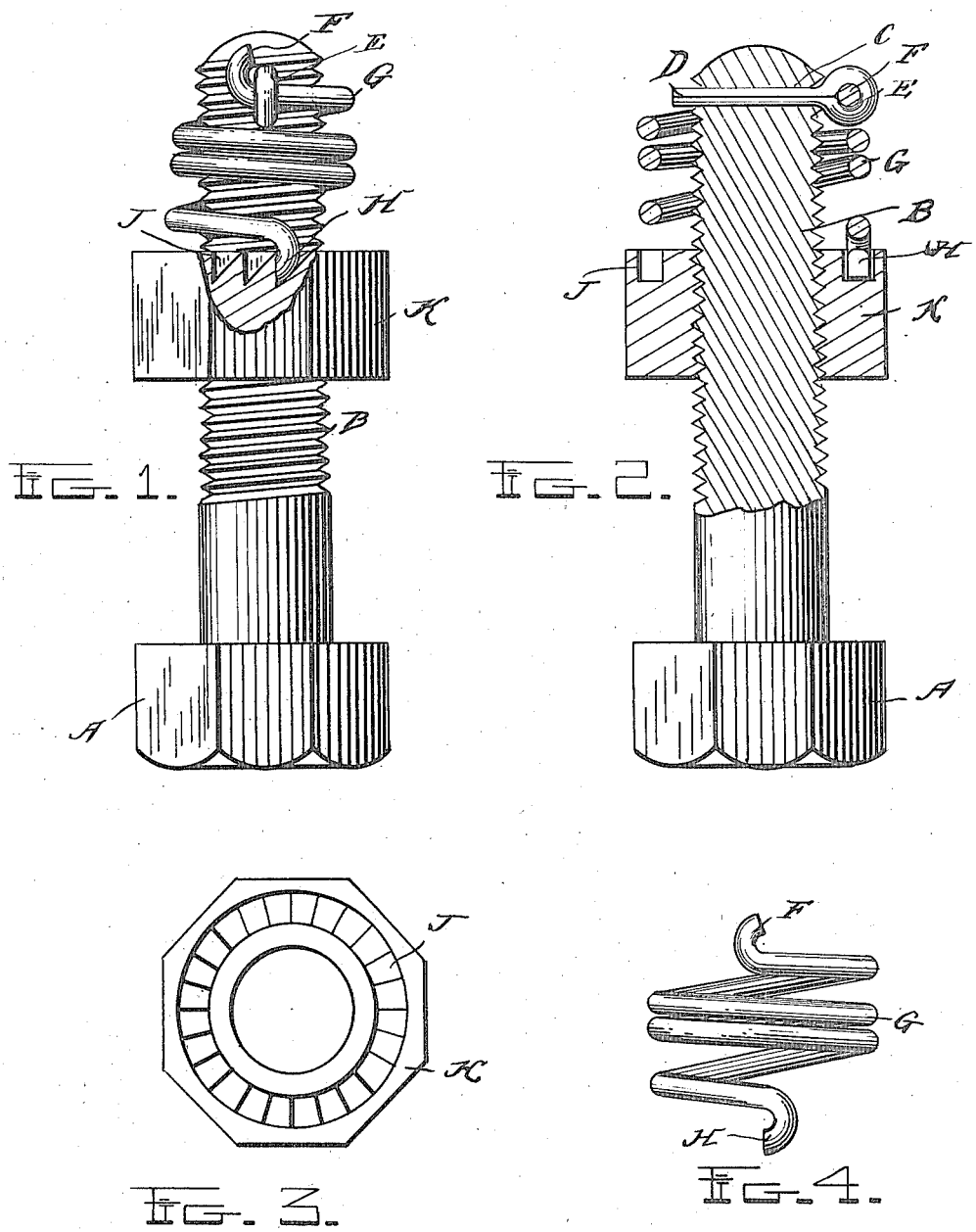

JOSEPH E. VILKIE, OF TITUSVILLE, PENNSYLVANIA.

NUT-LOCK.

1,090,662.  Specification of Letters Patent.  Patented Mar. 17, 1914.

Application filed April 21, 1913. Serial No. 762,554.

*To all whom it may concern:*

Be it known that I, JOSEPH E. VILKIE, a citizen of the United States, residing at Titusville, in the county of Crawford and State of Pennsylvania, have invented certain new and useful Improvements in Nut-Locks, of which the following is a specification.

My invention relates to improvements in nut locks and the main object of my invention is the provision of a nut lock which may be used in many situations where it would perform its function, such as upon railroad rails, car trucks, machinery, farming implements, and in fact in any suitation where an adjustable or accommodating nut lock could be used.

Another object of my invention is the provision of a nut lock in which the nut can be locked and retained in any desired position upon the threads of the bolt according to where the lock is doing service, and which will be of simple, durable and inexpensive construction, thus combining the requisites to insure a thoroughly efficient and practical device of this character.

To attain the desired objects, my invention consists of a nut lock embodying novel features of construction and combination of parts, substantially as shown, described and particularly defined by the claims.

In order that the detailed construction and the operation of my nut lock may be fully understood as well as its many uses and numerous advantages be appreciated, I have illustrated in the accompanying drawing a nut lock constructed in accordance with and embodying my invention.

Figure 1 represents a side elevation of the complete nut lock. Fig. 2 represents a view partly in elevation and vertical section, and Fig. 3 represents a plan view of the nut, showing the peculiar construction of circular channeled ratchet face thereon.

The nut lock may be used for various purposes, and would be of the size to suit the requirements, and consists of the bolt head A, the threaded bolt portion B, formed with a transverse channel C near its upper end, to receive the split spring pin D, having the eye or loop E, to receive the hooked upper end F, of the steel helix G, which encircles the threaded portion and exerts its tension downward to cause the lower end formed with the beveled detent or dog H, to engage the teeth of the circular ratchet J, formed in the upper face of the locking nut K.

In use the threaded portion of the bolt is passed through the rail or other structure in connection with which the lock is used and when in position the nut is screwed home, and then the steel helix is placed around the threaded portion of the bolt with its upper end retained in the spring pin and the detent at the lower end of the helix in engagement with the ratchet of the nut, and the tension of the helix under all conditions forces the said detent into engagement with the ratchet and locks the nut at any place upon the threaded portion of the bolt. The spring pin when inserted in the bolt has its ends spread slightly, locking the pin in position, and the pin thus retains the locking coil in proper position and prevents detachment, and the coil will lock the nut at any point upon the threaded portion of the bolt, said spring accommodating itself to the work and acting to lock the nut at any adjustment.

The many uses to which the nut lock may be put will be apparent to all persons skilled in such matters and it will be noted that the lock may be used in an efficient and practical manner in connection with short or long bolts, and thus adapt the device for use in any situation where a nut lock would be required.

The nut lock consists of only three parts which insures simplicity and durability and permits the production of the device at a very low price, which, taken in connection with its other features of merit will commend the nut lock as practical in every particular.

I claim:—

1. The nut lock herein described, consisting of the nut formed with the circular ratchet, the threaded bolt fitting the nut, and the coiled helix surrounding the threaded portion of the bolt, and having one end secured to the bolt and its other free end formed with a detent to engage the ratchet of the nut.

2. A nut lock consisting of the threaded bolt, a nut mounted on the threaded bolt and formed with a ratchet, a pin secured in the upper end of the bolt and formed with an eye, and a coiled locking helix surrounding the threaded portion of the bolt and having at its lower end a detent to engage the ratchet of the nut and at its upper end formed with a hook to engage the eye of the pin for securing said locking coil in position.

In testimony whereof I affix my signature in presence of two witnesses.

JOSEPH E. VILKIE.

Witnesses:
 JOHN R. FOY,
 J. E. MURRAY.